United States Patent
Tassinario et al.

(10) Patent No.: US 10,312,776 B2
(45) Date of Patent: Jun. 4, 2019

(54) SYNCHRONOUS MOTOR WITH PERMANENT MAGNETS

(75) Inventors: Giampiero Tassinario, Florence (IT); Ivan Flotats, Barcelona (ES); Francesc Cruellas, Tiana (ES)

(73) Assignee: Infranor Holding SA, Yverdon-les-Bains (CH)

( * ) Notice: Subject to any disclaimer, the term of this patent is extended or adjusted under 35 U.S.C. 154(b) by 442 days.

(21) Appl. No.: 13/326,621

(22) Filed: Dec. 15, 2011

(65) Prior Publication Data

US 2012/0153762 A1   Jun. 21, 2012

(30) Foreign Application Priority Data

Dec. 15, 2010   (EP) .................................... 10195053

(51) Int. Cl.
| | |
|---|---|
| *H02K 21/00* | (2006.01) |
| *H02K 3/04* | (2006.01) |
| *H02K 3/47* | (2006.01) |
| *H02K 21/24* | (2006.01) |
| *H02K 1/12* | (2006.01) |
| *H02K 15/00* | (2006.01) |

(52) U.S. Cl.
CPC .......... *H02K 15/0037* (2013.01); *H02K 3/04* (2013.01); *H02K 3/47* (2013.01); *H02K 1/12* (2013.01); *H02K 21/00* (2013.01); *H02K 21/24* (2013.01)

(58) Field of Classification Search
CPC .......... H02K 3/04; H02K 3/25; H02K 21/125; H02K 16/00; H02K 16/04
USPC ............... 310/156.32, 156.35, 208, 216.003, 310/216.014
See application file for complete search history.

(56) References Cited

U.S. PATENT DOCUMENTS

| | | | | |
|---|---|---|---|---|
| 4,130,769 A | * | 12/1978 | Karube | ........................... 310/46 |
| 4,336,475 A | * | 6/1982 | Morinaga et al. | ............ 310/198 |
| 4,568,862 A | | 2/1986 | Tassinario | |
| 4,629,948 A | | 12/1986 | Tassinario | |
| 4,733,118 A | * | 3/1988 | Mihalko | .................. H02K 3/47 |
| | | | | 310/156.08 |
| 4,743,813 A | | 5/1988 | Tassinario | |
| 4,837,921 A | | 6/1989 | Tassinario | |

(Continued)

FOREIGN PATENT DOCUMENTS

| | | | | |
|---|---|---|---|---|
| DE | 4438132 A | | 10/1994 | |
| DE | 10239729 | * | 3/2004 | ............... H02K 3/12 |

(Continued)

OTHER PUBLICATIONS

Notice of Reasons for Rejection issued by Japanese Patent Office for corresponding Japanese application 2011-273267 dated Oct. 5, 2015 with English translation.

(Continued)

*Primary Examiner* — Burton S Mullins
(74) *Attorney, Agent, or Firm* — Haug Partners LLP

(57) ABSTRACT

A synchronous motor with permanent magnets includes a rotor (110) provided with permanent magnets, and a winding (120) formed by overlapping coils located inside a slotless stator (100). The winding coils (120) are regularly distributed all around the 360° of the inside surface of the stator (100) and the ends of the coils are designed such that the winding has the same thickness throughout and the ends of the winding are at least partially inside the slotless stator (100).

7 Claims, 5 Drawing Sheets

(56) References Cited

U.S. PATENT DOCUMENTS

| | | | |
|---|---|---|---|
| 4,937,485 A * | 6/1990 | Mihalko | H02K 3/47 310/12.04 |
| 5,197,180 A * | 3/1993 | Mihalko | 29/596 |
| 5,304,884 A * | 4/1994 | Kitajima et al. | 310/198 |
| 5,313,131 A * | 5/1994 | Hibino et al. | 310/216.002 |
| 5,744,896 A * | 4/1998 | Kessinger, Jr. | H02K 3/04 310/198 |
| 6,649,844 B2 * | 11/2003 | Kusumoto | H02K 3/12 174/128.1 |
| 6,791,224 B1 * | 9/2004 | Ozawa et al. | 310/179 |
| 6,870,294 B2 * | 3/2005 | Holzheu | H02K 3/12 310/201 |
| 7,042,122 B1 * | 5/2006 | Dufala | H02K 3/47 310/179 |
| 7,269,890 B2 * | 9/2007 | Nagano et al. | 29/605 |
| 7,462,971 B2 | 12/2008 | Koide et al. | |
| 7,671,504 B2 * | 3/2010 | Rohrer et al. | 310/208 |
| 8,017,864 B2 * | 9/2011 | Phillips | 174/36 |
| 2005/0046299 A1 * | 3/2005 | Brown | H02K 3/493 310/207 |
| 2007/0200452 A1 | 8/2007 | Graham et al. | |
| 2009/0072083 A1 * | 3/2009 | Hanlon | B64C 13/42 244/87 |
| 2009/0072651 A1 * | 3/2009 | Yan et al. | 310/179 |
| 2010/0090558 A1 * | 4/2010 | Suzuki et al. | 310/208 |
| 2010/0182119 A1 | 7/2010 | Phillips | |
| 2010/0308683 A1 | 12/2010 | Horng et al. | |

FOREIGN PATENT DOCUMENTS

| | | | | |
|---|---|---|---|---|
| DE | 10 2006 010 168 A | 3/2006 | | |
| EP | 0 123 347 A | 10/1984 | | |
| EP | 0 159 069 A | 10/1985 | | |
| EP | 0 221 594 A | 5/1987 | | |
| EP | 0 313 514 A | 4/1989 | | |
| EP | 0519679 | * 12/1992 | | H02K 3/04 |
| EP | 1 079 501 A | 2/2001 | | |
| EP | 1 715 559 A | 10/2006 | | |
| EP | 1 715 562 A | 10/2006 | | |
| EP | 2 043 230 A | 4/2009 | | |
| EP | 2 180 581 A | 4/2010 | | |
| FR | 2908563 A | 5/2008 | | |
| GB | 2174252 B | 12/1988 | | |
| JP | 53-129802 | 11/1978 | | |
| JP | 57-173340 A | 10/1982 | | |
| JP | H01-133544 | 5/1989 | | |
| JP | 1-252135 | * 10/1989 | | H02K 3/04 |
| JP | 05-095644 A | 4/1993 | | |
| JP | 05-344691 | * 12/1993 | | H02K 15/04 |
| JP | 2799395 B | 7/1998 | | |
| JP | 2001-037130 A | 2/2001 | | |
| JP | 2003-070197 A | 3/2003 | | |
| JP | 2004-166388 A | 6/2004 | | |
| JP | 2005-522972 A | 7/2005 | | |
| JP | 2005-287285 A | 10/2005 | | |
| JP | 2006-019200 A | 1/2006 | | |
| JP | 2006-288187 A | 10/2006 | | |
| JP | 2007-159216 A | 6/2007 | | |
| JP | 2007-531485 A | 11/2007 | | |
| JP | 2008-061357 | 3/2008 | | |
| JP | 2009-131092 A | 6/2009 | | |
| JP | 2009-303335 | * 12/2009 | | H02K 3/04 |
| JP | 2010-098929 A | 4/2010 | | |
| WO | WO 93/06649 A | 4/1993 | | |
| WO | 0247239 | * 6/2002 | | H02K 3/12 |
| WO | WO 2008/020471 A | 2/2008 | | |
| WO | WO 2008/026771 A | 3/2008 | | |
| WO | 2008-119120 | * 10/2008 | | H02K 3/04 |

OTHER PUBLICATIONS

Search Report issued by European Patent Office for priority application EP 10 19 5053 dated Jun. 6, 2011.

Office Action issued in corresponding Japanese Application No. 2011-273267 dated Oct. 3, 2016 and its English Translation.

* cited by examiner

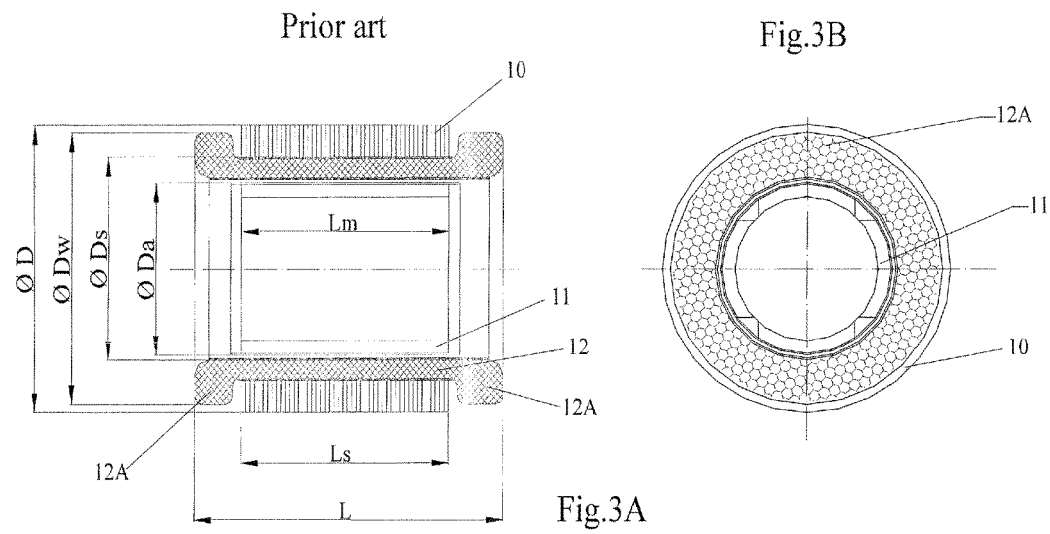
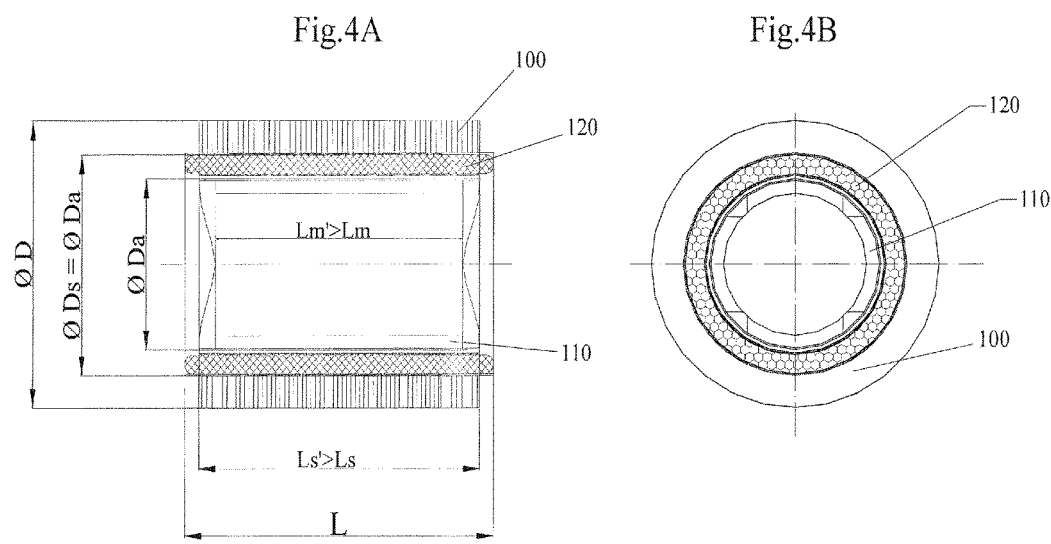

Fig.8
Fig.9
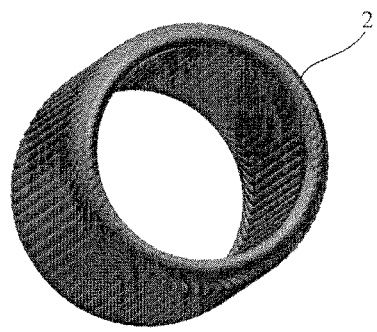
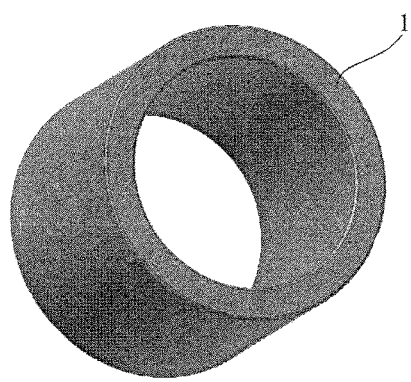
Prior art
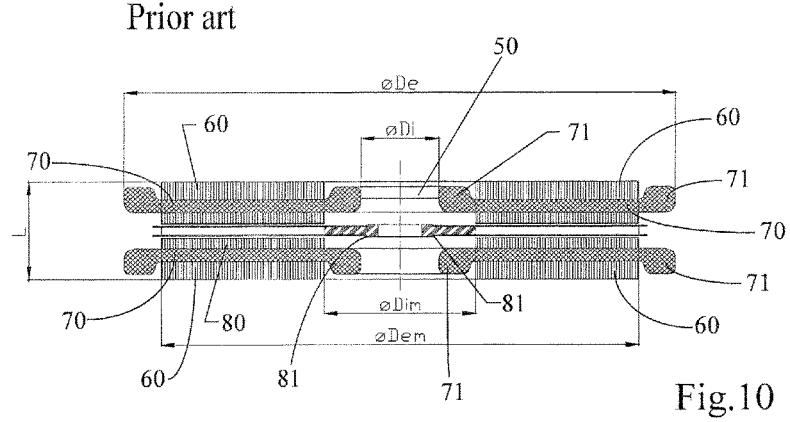
Fig.10
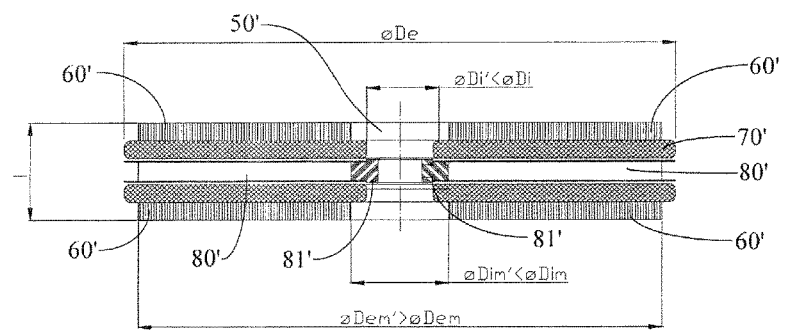
Fig.11

SYNCHRONOUS MOTOR WITH PERMANENT MAGNETS

This application claims priority benefits of European Patent Application Number 10195053.3 filed Dec. 15, 2010, the entire disclosure of which is incorporated herein by reference.

FIELD OF THE INVENTION

The present invention relates a synchronous motor with permanent magnets comprising a rotor provided with permanent magnets, a winding formed by overlapping coils located inside a slotless stator.

The main objective of the current invention is a synchronous motor with permanent magnets provided with a winding distributed continuously and homogeneously inside the stator without slots to achieve the minimum change of the torque capacity all around the movement of the rotor. Simplicity of mounting and recycling are also added values taken into account in this invention.

BACKGROUND OF THE INVENTION

The present invention is based on the Laplace force equation (F=i(l^B)) where it is stated that a current 'i' crossing a conductor is generating a force 'F' perpendicular to the conductor and the magnetic flux 'B' that is also crossing the conductor.

SUMMARY OF THE INVENTION

The motor according to the present invention relates to a synchronous motor with permanent magnets comprising a rotor provided with permanent magnets and a winding formed by overlapping coils located inside a slotless stator. The winding coils are regularly distributed all around the 360° of the inside surface of the stator and the ends of the coils are designed so that the winding has the same thickness throughout its length. The ends of the winding are at least partially inside the slotless stator.

As the two ends of the winding do not present the usual protuberances due to the overlapping of the turns of coils, the stator may be extended to face the ends of the winding. So we achieve a homogeneous torque capability, as no difference in reluctance appears and so the torque is only dependent on the winding designed.

It is also necessary to adjust perfectly the wire diameters of the coils with the space available for the copper that fulfills any possible lack of air that would not make the torque constant. Diameter of a space where magnets are placed and internal diameter of the winding are also relevant in the design to achieve the optimal distribution of the wires. The design not only is taking into account the wires of the coils but also the thickness of the space for the copper so that it is optimized not to waste more quantity of magnet than required but also the quantity of copper to achieve the maximum possible torque per volume available.

Although some concepts are similar with the patent EP 0'123'347, this invention differs slightly from it in the way that the winding is being surrounded by laminated electrical steel or equivalent material to increment efficiency.

According to a preferred embodiment the shape of the ends of the coils is deformed at the cross points of the coils by keeping their cross section surface constant, and only two coils turns are crossed at a same location of the ends of the coils to obtain said annular extensions.

After a deformation of the coils in a way that the section of the winding all around the circumference is constant and that only two coils turns are crossed at a same location of the ends, we have a winding with a constant width all along its length located inside the stator. Consequently, the length useful for the force of the wires to be applied as a torque is higher, and consequently is the power density.

Further, winding heat dissipation through the stator is much better and although some increment of the resistance may appear due to the length increment of the coils, it can be admitted due to the increment of useful magnetic length and improvement in the dissipation.

The use of windings having the same thickness throughout their length is possible for radial magnetic flux motors as well as for axial magnetic flux motors as defined in claims and as it will be described hereafter.

According to a feature the winding may be made by graphene material.

Other features are listed in the dependent claims.

Preferred embodiments of the present invention will be described with reference to the attached figures.

BRIEF DESCRIPTION OF THE DRAWINGS

FIGS. 3A and 3B are an axial cross section and a side view of a prior art radial magnetic flux motor;

FIGS. 4A and 4b are an axial cross section and a side view of a radial magnetic flux motor according to the present invention;

FIG. 8 is a perspective view of a winding according to the present invention relating to a radial magnetic flux motor;

FIG. 9 is a perspective view of a tubular slotless stator relating to a radial magnetic flux motor;

FIG. 10 is an axial cross section of a prior art axial magnetic flux motor.

FIG. 11 is an axial cross section of axial magnetic flux motor according to the present invention.

DETAILED DESCRIPTION OF THE INVENTION

Figure 1:
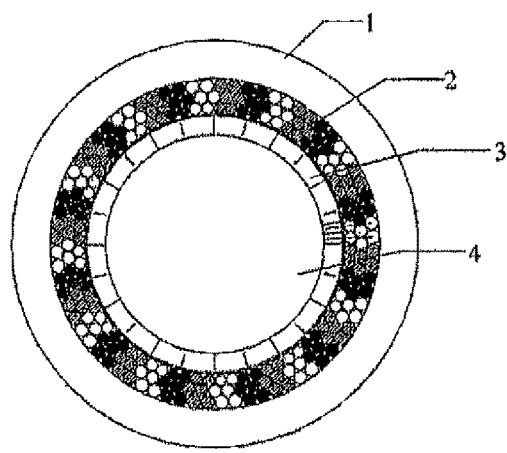
FIG. 1 is a radial cross section of a radial magnetic flux motor.
Figure 7:
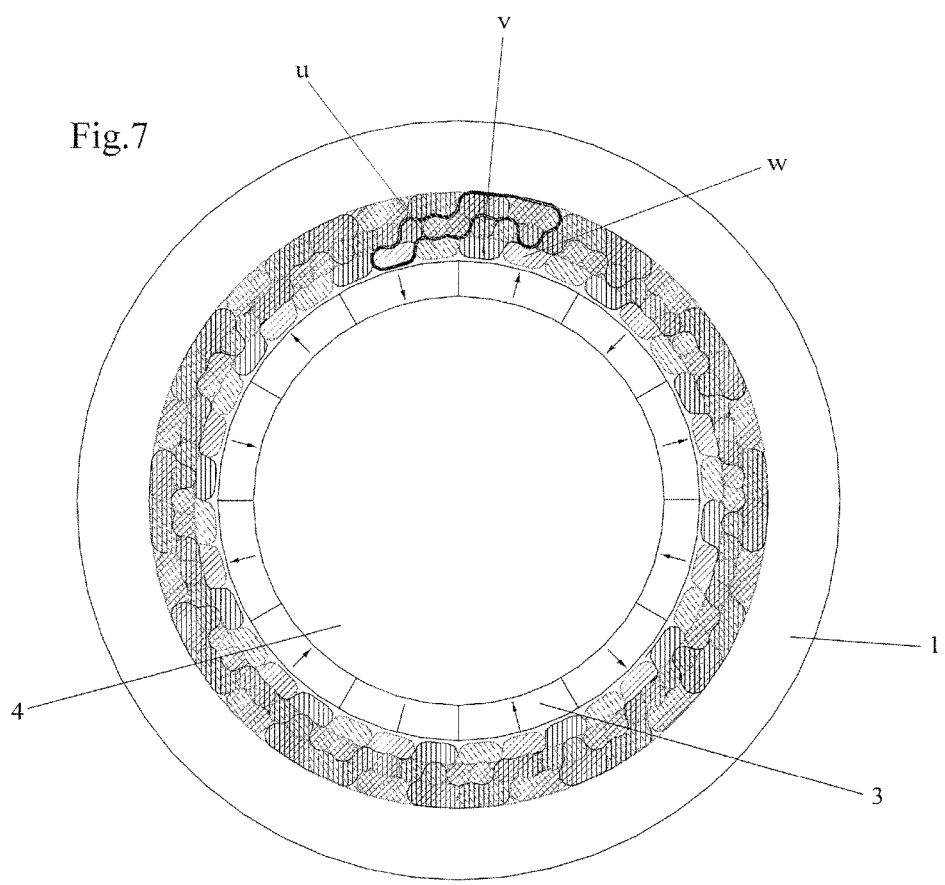
FIG. 7 is a radial cross section of the end the winding of a radial magnetic flux motor according to the present invention.

In FIG. 1, a radial cross section of a radial magnetic flux motor is shown. We see the tubular stator 1, the tubular winding 2, the permanent magnets 3 placed on the lateral surface of the rotor 4. The windings of the three electrical phases U, V, W (see FIG. 7) are represented all around the tubular winding 2 periphery.

A perfect regular distribution of wires all around the inside surface of the stator is provided to obtain a powerful and high efficiency motor able to produce a constant power torque all around its movement. Although there are some other patents like EP 0'159'069 which shows magnetic motor solutions similar to our invention in flat execution or EP 0'221'594, in our invention we distribute the wires perfectly all around any possible position of the circumference so the torque produced is always constant.

Further, standard designs in slotless or slotted motors normally align the length of the magnets with the length of stator. As this kind of used winding is overlapped (it allows higher range of speed due to the lower number of poles required), the turns of the coils for different phases of the motor are crossed (FIG. 2, at CP) and so they increment the thickness of the winding at its ends, creating two protuberant annular parts.

In order to increase the useful area which is in front of the magnets and not to align the wires there so that the torque produced for the current crossing the wires is maximized, the crosses of the turns of the coils are being done in what we call 'end of the coils' out of the stator. However, it implies that the end of the winding increases its volume in standard designs so that a stator cannot be located there. It has a significant importance as the heat being produced in this part of the motors is hardly evacuated. Some inventions like patent EP 1'715'562 capsulate the windings to help the heat go out of the motor although the efficiency thereof cannot be compared with heat dissipation of the iron or aluminum.

Being conscious of this behavior, and of the importance to have the coils of the winding close to the housing (normally aluminum) or to the stator, the present invention shows a way to design the winding optimizing this phenomenon.

A comparison of volumes in standard designs and our invention is shown in FIGS. 3A, 3B, 4A and 4B.

In FIGS. 3A and 3B they are represented: a tubular slotless stator 10, a tubular winding 12 with the annular protuberances 12A located in the crossing of the turns of the coils and the rotor with the permanent magnets 11.

In FIGS. 4A and 4B they are represented the same elements: a tubular stator 100, a tubular winding 120 without the annular protuberances located at the crossing of the turns of the coils and the rotor with the permanent magnets 110.

It is easy to see that in FIGS. 4A and 4B the stator 100 is covering nearly all the winding 120. Indeed for an overall diameter D and length L, which are the same for both motors, we have a length of the stator in FIG. 4B Ls'>Ls, a length of the magnets Lm'>Lm due to the removal of the annular protuberances 12A. To achieve this goal we have to deform the ends of the coils and to cross the turns of only two coils at same location.

Upon modifying the shape of the coils when being made by press deformation, we must keep the surface of the section (bxa) of the coil constant but without the need of keeping values of 'b' and 'a' constants. So if we modify these parameters all along the coils, we are able to achieve longer coils but in total winding having the same section. (FIGS. 5 and 6).

Figure 5:
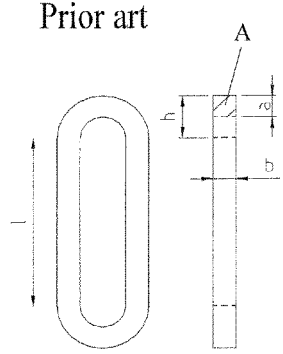
FIG. 5 shows a plane and a side view of a prior art coil.
Figure 6:
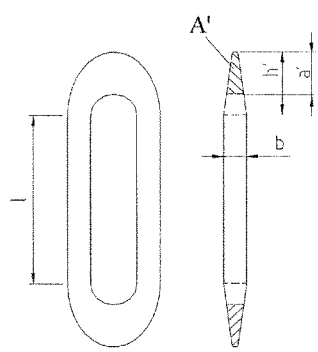
FIG. 6 shows a plane and a side view of a coil according to the present invention.

In FIG. 5 a usual coil is represented with a rectangular section. The length of the coil before the turn is '1', the height of the turn is 'h' and the dimensions of the rectangular section in the entire length of the coil are 'a' and 'b'. So the surface of the coil section is equal to A='b'×'a'. As it is important to keep the value A constant, in FIG. 6 the turn coil is deformed so that even the parameters 'a'', 'h'' are modified to have the surface A' of the section at the turns of a coil equal to A.

Figure 2:
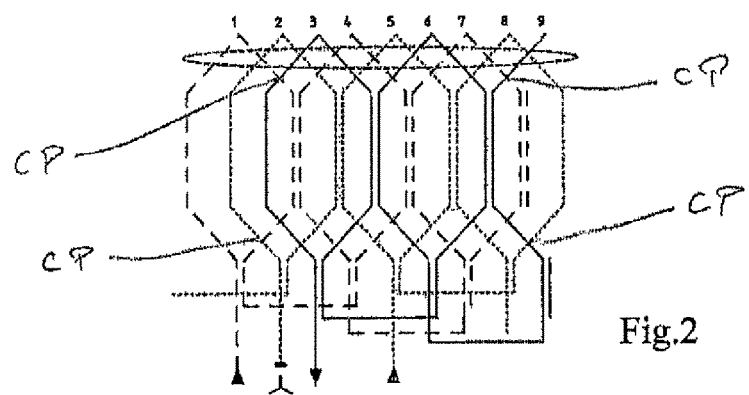
FIG. 2 is a usual representation of a motor winding diagram.

The objective is to reduce the thickness of the coils fundamentally at the point where the turns of two coils cross in the winding diagram (FIG. 2). Therefore we do not increase the radial thickness of the winding and it is kept constant all along the winding length. This allows both increasing the length of the stator and obtaining more torque, as more length is useful for the torque.

Another advantage is the improvement of the heat evacuation as the ends of the coils are in contact with stator material instead of the air. Stator material is much more conductive for the heat and so heat will be evacuated much easily.

Figure 12:
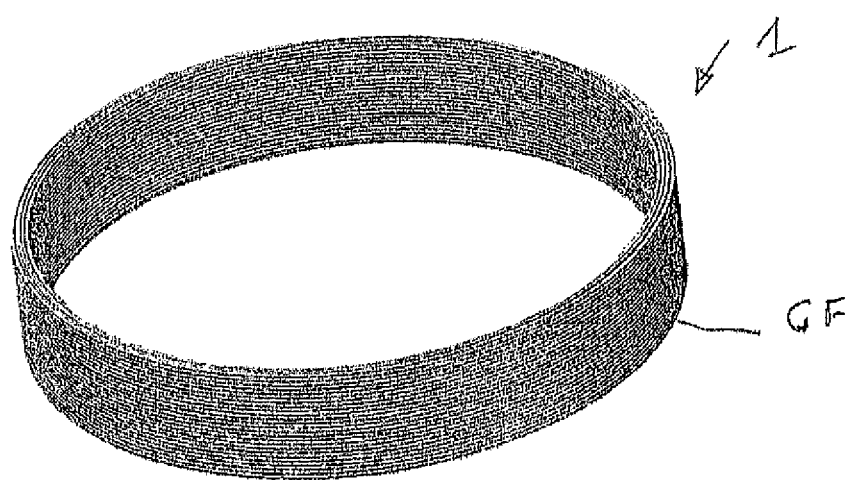
FIG. 12 is a perspective view of a stator made from magnetic wires coiled to produce the stator tube.

Depending on the wires used, and section required, coils of the winding will be deformed in order to adjust its profile to the following coil next to it. The objective is that the crosses are only being provided by two different coils. Taking for example the wire distribution of FIG. 1, one possible shape of the 'end of the coil' could be the one shown in FIG. 7. This particular shape of the turns of the coils makes it possible to have the same thickness all along the winding. It can be seen that there are two crosses all around a circumference. The turns of three coils never have a coincidence in any point. There are a maximum of two crossings. It is clear that the height of the coil is being modified as shown in FIG. 6 and the copper volume is the same as the coils increase in axial direction. So thickness of the winding is constant all along the stator as internal and external diameters of the winding do not have any increment of copper volume. For this reason the length of the stator can cover all ends of the coils. The winding is covering a volume having a perfect cylindrical shape. This particular property allows a person to construct the stator not only with magnetic steel, but also with magnetic powder like in EP 1'715'559. It is also possible to use a magnetic wire (see FIG. 12, stator 1 and graphene wire GF) coiled to produce the tubular stator as described in EP 0'313'514. Such a coiled stator reduces the cost for producing stators significantly as it uses less quantity of raw material.

This type of construction has several advantages. It simplifies significantly the structure of the winding, as it can be mounted separately from the stator, and so the assembly is much easier. In an opposite way, whenever the motor needs to be destroyed, it is easy to separate the copper of the winding from the stator. It is possible then to recycle efficiently.

FIG. 8 shows a tubular winding according to the invention. In FIG. 9 a slotless tubular stator is shown. It is made by stacking punched ring shaped laminations of magnetic steel. The press used to punch slotless rings is less expensive as its life is increased.

In FIG. 10 an axial cross section of axial magnetic flux motor is shown. A disk shape rotor 50 is provided with permanent magnets 80 that are hold by magnet holders 81. The slotless stator comprises two annular parts 60 made by magnetic material laminations. The winding 70 comprises two annular parts presenting at their embossed end parts 71 due to the crossing of the turns of the coils.

In FIG. 11 an axial magnetic flux motor according to the present invention is shown. A disk shape rotor 50' is provided with permanent magnets 80' that are hold by magnet holders 81'. The slotless stator comprises two annular parts 60' made by magnetic material laminations. The windings 70' have the same thickness throughout their length. By comparing the motors having the same overall diameter and length, it is obvious the active surface of the winding is facing a greater surface of the stator and a greater surface of the permanent magnets. So we have a more powerful motor. The stator may be made by any kind of magnetic material.

The wires of the winding may be made by using graphene materials. This material has a bigger current density value than copper, and so more power can be obtained. Further graphene presents a higher thermal conductivity than copper and so it will be easier to transfer the heat out of the motor.

What is claimed is:

1. A synchronous motor with permanent magnets comprising:
   a rotor configured to rotate along a rotation axis provided with permanent magnets; and
   a winding of overlapping coils located inside a slotless stator and comprising at least three electrical phases,
   wherein the coils of the winding are regularly distributed all around the 360° of the inside surface of the stator,
   wherein the coils of the winding comprise first portions having a substantially rectangular section and turn portions, the first portion extending between two opposite turn portions,
   wherein the dimensions of the rectangular section of each coil have a width "a" and a thickness "b", such that the cross-sectional area of the rectangular section is equal to A, wherein A='b'בa',
   wherein the turn portions comprise a thickness less than the thickness "b" in the first portions and a cross-sectional area equal to "A",
   wherein the cross-sectional area A of the coils is constant,
   wherein the winding has the same radial thickness and a constant cross-section over its length,
   wherein only two ends of coils at the turn portions are crossed at a same location, and
   wherein the slotless stator extends over the crossing of the coils at ends of the coils.

2. A synchronous motor according to claim 1, wherein the synchronous motor includes a radial magnetic flux motor provided with a cylindrical rotor, the permanent magnets located on the lateral surface of the rotor, and
   wherein the winding is a tubular winding and the stator is a slotless tubular stator.

3. A synchronous motor according to claim 2, wherein the stator is made from a magnetic wire coiled to produce a tube of the slotless tubular stator.

4. A synchronous motor according to claim 2, wherein the stator is made from magnetic powder composite or materials capable of being sintered.

5. A synchronous motor according to claim 1, wherein the stator is made from magnetic steel laminations.

6. A synchronous motor according to claim 1, wherein the wires of the winding are made of graphene materials.

7. An axial magnetic flux motor with permanent magnets disposed along a rotation axis, comprising:
   two flat annular stator parts forming a slotless stator;
   a disk shaped rotor provided with permanent magnets located inside the two flat annular stator parts; and
   two winding, each of which have overlapping coils, distributed around surfaces of the two flat annular stator parts proximal to the disk shape rotor comprising at least three electrical phases,
   wherein the coils of the windings comprise first portions having a substantially rectangular section and turn portions, the first portion extending between two opposite turn portions,
   wherein the dimensions of the rectangular section of each coil comprise a width "a" and a thickness "b", such that the cross-sectional area of the rectangular section is equal to A, wherein A='b'בa',
   wherein the turn portions comprise a thickness less than the thickness "b" in the first portions and a cross-sectional area equal to "A",
   wherein the cross-sectional area A of the coils is constant,
   wherein the winding has the same axial thickness and a constant cross-section over its length, and
   wherein only two ends of coils at the turn portions are crossed at a same location, and
   wherein the slotless stator extends over the crossing of the coils at ends of the coils.

* * * * *